(Model.)

J. H. THORP.
Artificial Stone or Building Blocks.

No. 240,933.          Patented May 3, 1881.

WITNESSES.

INVENTOR

J. H. Thorp.

BY

ATTORNEY.

UNITED STATES PATENT OFFICE.

JAMES H. THORP, OF BALTIMORE, MARYLAND.

ARTIFICIAL STONE OR BUILDING-BLOCK.

SPECIFICATION forming part of Letters Patent No. 240,933, dated May 3, 1881.

Application filed April 2, 1881. (Model.)

*To all whom it may concern:*

Be it known that I, JAMES H. THORP, of Baltimore city, State of Maryland, have invented certain new and useful Improvements in Artificial Stones or Building-Blocks; and I hereby declare the same to be fully, clearly, and exactly described as follows, reference being had to the accompanying drawings, in which—

Figure 1:
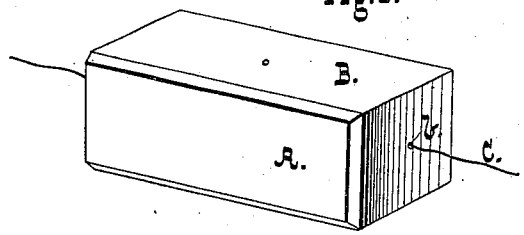
Figure 2:
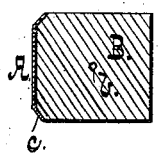
Figure 3:
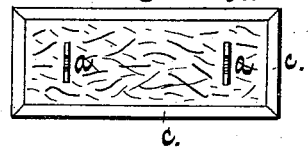
Figure 4:
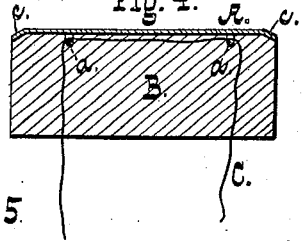
Figure 5:
Figure 6:
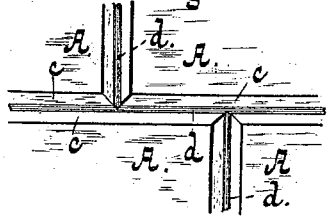

Figure 1 is a perspective view of a block of stone embodying my present invention. Fig. 2 is a vertical sectional view of the same. Fig. 3 is a rear elevation of the face-plate. Fig. 4 is a sectional view at right angles to that of Fig. 2. Fig. 5 is a perspective view of the plate which I interpose between the blocks in building; and Fig. 6 is a front elevation, showing the junction of several blocks.

My invention has for its object to provide a strong and handsome material for the various purposes to which natural stone is applied, such as for building purposes, for tiling, for tops for tables and other articles of furniture, and other analogous uses.

Heretofore in the construction of artificial stone, and in the use of natural stone for outside work, the material has sooner or later undergone a species of disintegration more or less superficial, due to the changes of temperature and weather, and has become roughened, or has shown a tendency to crumble. This effect is mainly due to two causes—viz., the porosity of the stone admitting moisture, which, on freezing, tended to crack the stone, and the solubility, to a certain extent, of the material in water. In the case of stone consisting wholly or in part of carbonate of lime, this solvent action of water containing carbonic acid is greater than is generally supposed, and soon destroys the surface polish. I obviate the deleterious action of water or moisture by practically waterproofing the stone, and this I accomplish by veneering the stone with any suitable vitrifiable kaolin or earthenware having a glaze.

My invention consists, first, in a stone formed by facing a suitable composition with a shell of porcelain or other earthenware having a surface glaze; second, in the particular composition used; third, in embedding in the body of the stone a wire or wires, whereby the blocks may be bound together or to beams in building; or in lieu of this I perforate the stones for the insertion of the wires; and, fourth, in a partition-sheet designed to prevent access of moisture between the blocks of stone.

In the drawings, A is a shell of suitable glazed earthenware, porcelain being, by preference, used, having its edges *c* dished, as shown, so that the face of the stone will show a marginal chamfer. The rear face of the shell is unglazed, and by preference roughened, (see Fig. 3,) in order to increase the adhesion thereto of the block B, and on it is formed one or more perforated lugs, *a a*. These shells are made of any desired size, shape, or color, and may have a design burned into their surface. In the case of tombstones or monuments the entire surface or shell may be formed in one piece, or may consist of several sheets or faces united by the filling or otherwise.

In preparing the filling I use as a base a mixture of one part of lime and two parts of sand, more or less, and moisten the same with a solution of three pounds each of shellac in solution, glue, and borax, four pounds of alum, and twenty of sal-soda dissolved in one hundred gallons of water. The shell or veneer being placed face downward in a suitable mold, the moistened mixture of sand and lime is pressed and tamped in the mold, wires C being first attached to the lugs *a* of the shell. In lieu of this, the stone is provided with one or more perforations for the subsequent insertion of the wires. The stone, being allowed to dry, is ready for use.

Instead of the mixture of sand and lime, I may use sand and cement, or cement alone, as a filling; and instead of providing the shells with perforated lugs, I may simply furnish them with prongs or pins for holding the body of the stone or the wire, or both.

In making tiling the cement is first placed in the mold, and the shell is then pressed down upon it while the cement is still in a plastic state.

In using the stones for building purposes, and in order to prevent access of moisture between the stones, I interpose plates D, of metal, rubber, felt, or equivalent, having beaded edges *d*, which are pressed home close to the meeting edges of the stones. The peculiar chamfer of the blocks prevents the porcelain faces from coming in contact, and obviates all danger of them being broken or chipped, as the weight is sustained wholly by the body of the stone.

It is obvious that as the only exposed surface of the stone is glazed, the ordinary effects of the action of moisture are not to be feared and the stone is not liable to become rough or disintegrated.

What I claim is—

1. A block, slab, or other article of artificial stone, consisting of a face plate or shell of porcelain or its equivalent and a backing or body of a suitable composition united thereto, as set forth.

2. An artificial stone consisting in a body composed of sand and lime or cement set with a solution of shellac, glue, borax, alum, and sal-soda, and having a facing of porcelain or its equivalent, as set forth.

3. An artificial stone, slab, or other article having a chamfered or dished face-plate of porcelain or its equivalent, as set forth.

4. An artificial stone having one or more wires embedded therein, and adapted for connection to bind the tiers of stones together or to the beams, as set forth.

5. In combination with an artificial or natural stone, a partition-plate, D, adapted, as described, for insertion between the tiers of stones to prevent the entrance of moisture, as set forth.

6. As a new article of manufacture, a face-plate for artificial stones, consisting of a shell of porcelain or its equivalent, having a glazed exterior and unglazed or roughened interior face adapted for the adhesion thereto of the plastic composition, as set forth.

7. The chamfered or dished plate A, having glazed exterior and lugs or pins on its inner face, holding the body B, wires C, or both, as set forth.

JAMES H. THORP.

Witnesses:
HATTIE C. THORP,
R. D. WILLIAMS.